(12) United States Patent
Warmuth

(10) Patent No.: US 12,140,492 B2
(45) Date of Patent: Nov. 12, 2024

(54) EVALUATION SYSTEM FOR AN OPTICAL DEVICE

(71) Applicant: ZF ACTIVE SAFETY AND ELECTRONICS US LLC, Livonia, MI (US)

(72) Inventor: Matthew W. Warmuth, Northville, MI (US)

(73) Assignee: ZF ACTIVE SAFETY AND ELECTRONICS US LLC, Livonia, MI (US)

(*) Notice: Subject to any disclaimer, the term of this patent is extended or adjusted under 35 U.S.C. 154(b) by 0 days.

(21) Appl. No.: 17/863,680

(22) Filed: Jul. 13, 2022

(65) Prior Publication Data
US 2023/0204455 A1 Jun. 29, 2023

Related U.S. Application Data

(60) Provisional application No. 63/232,687, filed on Aug. 13, 2021.

(51) Int. Cl.
G01M 11/02 (2006.01)

(52) U.S. Cl.
CPC .... *G01M 11/0264* (2013.01); *G01M 11/0221* (2013.01); *G01M 11/0292* (2013.01); *G01M 11/0257* (2013.01)

(58) Field of Classification Search
CPC ......... G01M 11/0264; G01M 11/0221; G01M 11/0292; G01M 11/0257; H04N 17/002
See application file for complete search history.

(56) References Cited

U.S. PATENT DOCUMENTS 10,567,749 B1 * 2/2020 Warmuth ............... G06T 7/90
2017/0180618 A1 * 6/2017 Georgiev ............... G02B 7/102

FOREIGN PATENT DOCUMENTS

TW 201023000 A * 6/2010 ............ G02B 7/023
WO WO-2020241868 A1 * 12/2020 ........... G02B 21/244

* cited by examiner

*Primary Examiner* — Tarifur R Chowdhury
*Assistant Examiner* — Judy Dao Tran
(74) *Attorney, Agent, or Firm* — Tarolli, Sundheim, Covell & Tummino LLP

(57) ABSTRACT

Systems and methods for evaluating an optical device include a pattern source that provides a pattern suitable for use in the evaluating the optical device. The optical device images the pattern to provide an image. The optical device has an optical device and an image sensor, with an associated image sensor plane. An image analysis system determines, from the image, a tip and a tilt for a component of the optical device relative to the image sensor plane that maximizes a depth of focus for the optical device.

16 Claims, 4 Drawing Sheets

EVALUATION SYSTEM FOR AN OPTICAL DEVICE

RELATED APPLICATIONS

This application claims priority from U.S. Provisional Patent Application Ser. No. 63/232,687, filed on Aug. 13, 2021 and entitled "Evaluation System for an Optical Device," which is hereby incorporated by reference in its entirety.

TECHNICAL FIELD

The present invention relates to optics, and more particularly, to a method of evaluating an optical device, such as a camera system.

BACKGROUND

The modulation transfer function (MTF) of an optical device, such as a camera system having an optical device and an image sensor is typically used to quantify the overall imaging performance of the optical device. As a result, knowing the MTF of each optical device and image sensor within a system allows a designer to make the appropriate selection when optimizing the camera system. Typically, the MTF of several positions in the field-of-view (FOV) of the optical device is measured. The position of the optical device relative to the image sensor is generally optimized to the best MTF of the optical device. However, as camera performance requirements increase, such as wider field-of-view, smaller pixels, lower F #'s, etc., the use of aspherical lens elements increases to reduce size of the optical device, which in turn increases the sensitivity of lens asymmetry to lens fabrication and assembly errors.

SUMMARY OF THE INVENTION

In accordance with an aspect of the present invention, a system is provided for evaluating an optical device. The system includes a pattern source that provides a pattern suitable for use in the evaluating the optical device. The optical device images the pattern to provide an image. The optical device has an optical device and an image sensor with an associated image sensor plane. An image analysis system determines, from the image, a tip and a tilt for a component of the optical device relative to the image sensor plane that maximizes a depth of focus for the optical device.

In accordance with another aspect of the present invention, a method for evaluating an optical device includes imaging a pattern with the optical device to provide an image. The optical device includes an image sensor with an associated image sensor plane. A tip and a tilt for a component of the optical device relative to the image sensor plane that maximizes a depth of focus for the optical device is determined from metrics of the image.

DETAILED DESCRIPTION

Figure 1:
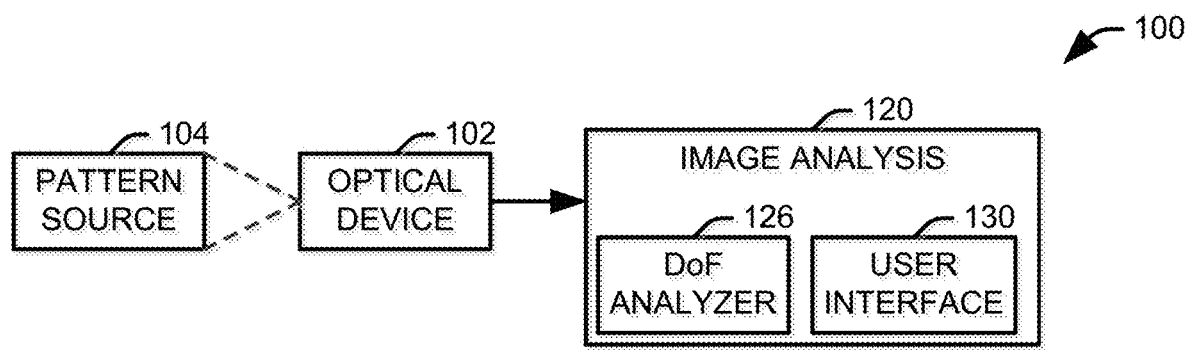
FIG. 1 illustrates an example of a system for evaluating an optical device.

As used herein, a "focus position" is the distance between a lens and an image sensor plane with which is it paired in a direction that is orthogonal to the image sensor plane, the direction orthogonal to the image sensor plane defining a first axis.

As used herein, a "tip" of a lens or other optical assembly is a departure of the optical assembly from a plane parallel with the image sensor plane along a second axis that is orthogonal to the first axis.

As used herein, a "tilt" of a lens or other optical assembly is a departure of the optical assembly from the plane parallel with the image sensor plane along a third axis that is orthogonal to each of the first axis and the second axis.

In order to build cameras with the best optical performance, for example, as measured in a modulation transfer function (MTF), the position and angle of an optical device's optical axis needs to be adjusted relative to the image sensor plane it is being paired with. The image space depth-of-focus for a given lens-sensor pair is the range of focus positions that meets all the camera level requirements and gives an indication of the camera's robustness to process variation and allowed changes due to thermal changes or other processes that change the dimensions and angles of the optical axis relative to the image sensor plane.

As camera performance requirements have increased, including wider FOV, smaller pixels, lower F #'s, etc., it drives lens designs to have more aspherical elements to reduce size, which in turn increases the sensitivity of lens asymmetry to lens fabrication and assembly errors. During the process of optimization, an alignment system typically measures the through-focus optical performance, represented by the modulation transfer function (MTF), of several positions in the field-of-view (FOV). Most camera alignment systems today assume circular symmetry of the MTF and adjust the tip/tilt of the lens to achieve a matched peak focus position of several off-axis field points, referred to herein as representative locations, at the same image height. This focus algorithm can cause a suboptimal choice for tip/tilt of asymmetric lenses.

In the systems and methods provided herein, instead of trying to find the optimal tip and tilt that brings the peaks of the different field azimuths to a common position, an optimal tip and tilt are found to create the largest depth-of-focus for the lens. Using the through-focus curves and knowing the real image heights of these locations in the field of view, the system can predict how the curves will shift relative to each other for given tips and tilts and find the tip and tilt that maximizes the overall depth of focus across all the available through-focus curves.

A method of evaluating an optical device, such as a camera assembly having an optical device and an image sensor includes measuring metrics of the optical device. The metrics of the optical device may be measured in any desired manner. In one example, printed targets may be mounted to a wall, one target may be mounted for on-axis measurements, and other targets are used for off-axis measurements.

The optical device and the targets may be separated by a hyperfocal distance of the camera, and the wall targets are illuminated by an LED light panel. Reflected light from the targets are captured by the optical device, and metrics of the optical device are measured. It is contemplated that metrics of more than one position in the FOV may be measured.

The metrics that are measured may be used to determine an optimal position for an optical axis of the optical device relative to the image sensor plane or the tilt/tip of the optical device relative to the image sensor plane. The metrics that are measured are used to optimize a depth-of-focus for the optical device. The metrics that are measured may be used to maximize the depth-of-focus (depth of focus) for the optical device. The optimized depth of focus provides an optimal position for the optical axis of the optical device relative to the image sensor plane. It is contemplated that the real image heights of the targets may be used to help determine the optimized depth of focus of the optical device.

FIG. 1 illustrates an example of a system 100 for evaluating an optical device 102. The optical device 102 may be a camera system having an optical assembly, comprising a set of one or more optical components, and an image sensor. The system 100 includes a pattern source 104 configured to provide a pattern representing a desired image. The pattern source 104 may be any desired pattern and may have a plurality of targets. The pattern source 104 may be a printed pattern or a coherent or non-coherent light source passed through a transparent plate having a pattern of opaque or translucent material thereon to provide the desired pattern. Alternatively, the pattern source 104 can represent a display, such as an LCD display, provided with appropriate input to display one or more targets. In another example, the pattern source 104 can use a plurality of collimators, implemented as individual targets, or reticles on glass with incoherent back illumination and a lens to project the reticle to any desired object distance.

The optical device 102 images the pattern provided by the pattern source 104 to provide at least one image. The optical device 102 may collect a plurality of images at different focus positions. At least one image from the optical device 102 is provided to an image analysis system 120. It will be appreciated that the image analysis system 120 can be implemented as machine-readable instructions stored on a non-transitory computer readable medium and executed by an associated processor, as dedicated hardware, for example, a field programmable gate array or an application specific integrated circuit, or as a combination of software and dedicated hardware. Further, it will be appreciated that the image analysis system 120 can be distributed across multiple media and hardware systems.

The image analysis system 120 is configured to calculate optical quality metrics for the optical device 102 from the at least one image taken. It is contemplated that metrics of a plurality of images collected at different focus positions, positions of the component, and various locations within the FOV may be measured. In one implementation, the metrics include a set of modulation transfer function values associated with each of a plurality of targets in the pattern, with each of the targets representing an associated location with a field of view of the optical device 102. In another implementation, the optical quality metrics can include a surrogate value for the modulation transfer function that correlates with the modulation transfer function. Each set of metrics can contain, for example, values for each of a plurality of positions of the component along each of a plurality of focus positions, such that a value of the modulation transfer function is generated for each ordered pair or triple, including one or two position values (e.g., tip and tilt) and focus position. A depth of focus (DoF) analyzer 126 determines, from the metrics, a tip and tilt for at least one optical component within the optical device 102 that optimizes the depth of field. It will be appreciated that the optimal depth of focus can be determined by any appropriate optimization algorithm. In one example, a generalized non-linear gradient optimization is applied to select the optimal tip and tilt.

During the optimization, the optimal values for the tip and the tilt are selected to provide the maximum depth of focus, that is, the largest range of focus positions for which the metric for the optical device 102 is above a threshold value for each of the plurality of targets. It will be appreciated that the thresholds associated with the target can be different. For example, targets that are close to a center of the field of view may have a higher threshold value than locations on a periphery of the field of view. The depth of focus analyzer 126 may use the known image locations of the targets to help determine the optimized depth of focus of the optical device. The determined optimal tip and tilt for the optical component is then provided to a user via a user interface 130. The user interface 130 can include an output device, such as a display, as well as appropriate software for interacting with the system via one or more input devices, such as a mouse, keyboard, or touchscreen. It will be appreciated that the optical component can be one component of a larger optical system, and that the optimal tip and tilt for each optical component can be determined individually.

Figure 2:
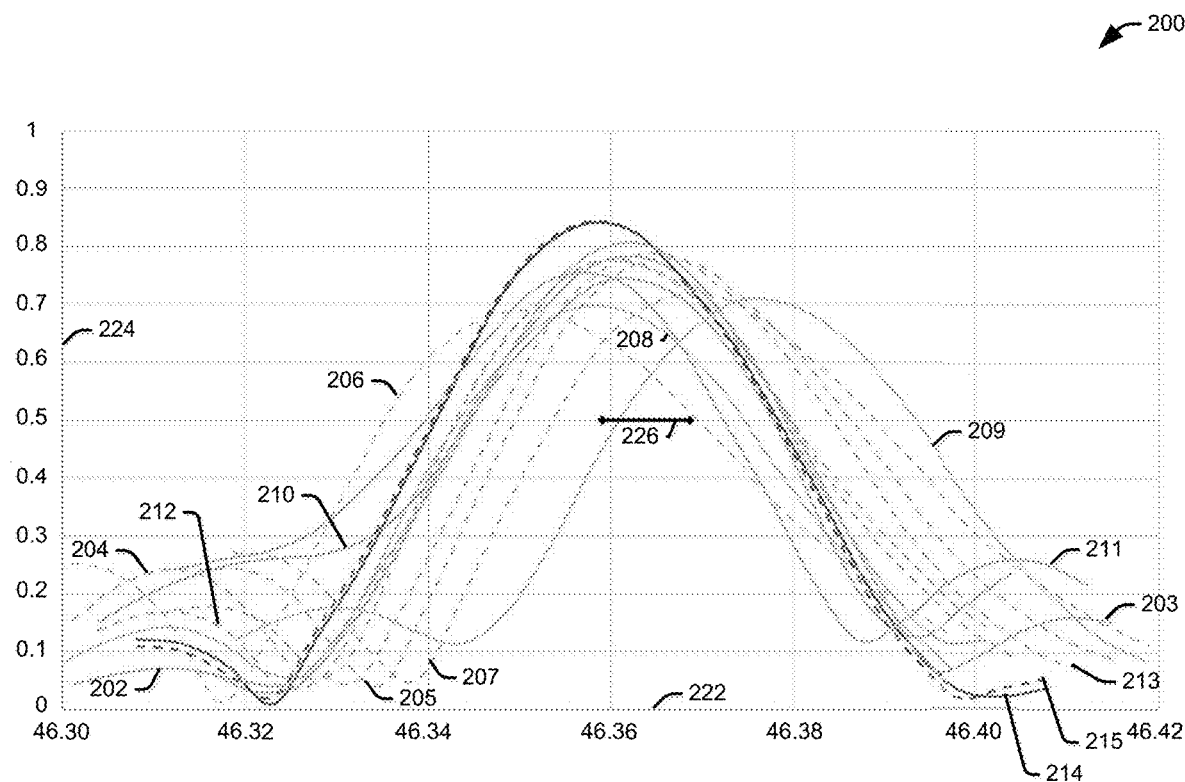
FIG. 2 illustrates a first chart of the modulation transfer function curves for a lens within an optical device for each of a plurality of locations on a calibration pattern as a function of a focus position of the optical device.

FIG. 2 illustrates a first chart 200 of the modulation transfer function (MTF) curves for a lens within an optical device for each of a plurality of locations 202-215 on a calibration pattern as a function of a focus position of the optical device. The horizontal axis 222 represents the focus position, measured in millimeters, and the vertical axis 224 represents the modulation transfer function. A depth of focus for the optical device is indicated as a solid, double headed arrow 226. It will be appreciated that the modulation transfer function of the lens is a function of a tip and a tilt of the lens, and in the illustrated chart 200, the tip and the tilt are selected to optimize the MTF across the plurality of locations 202-215. In particular, the tip and tilt are selected to align the peaks of the modulation transfer function curves for a first representative location 202 and a second representative location 203, which has the effect of clustering the peaks associated with all of the locations 202-215 in a range around the focus position for which the peaks are aligned.

Figure 3:
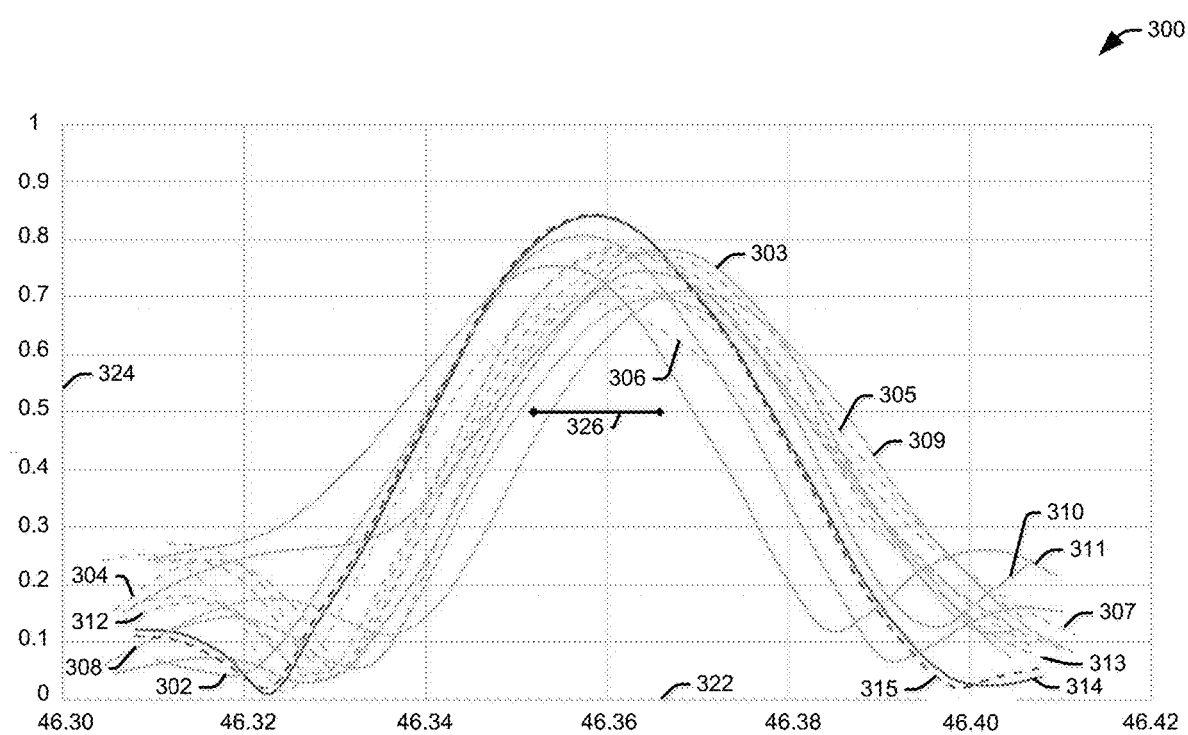
FIG. 3 illustrates a second chart of the modulation transfer function curves for a lens within an optical device for each of a plurality of locations on a calibration pattern as a function of a focus position of the optical device.

FIG. 3 illustrates a second chart 300 of the modulation transfer function (MTF) curves for a lens within an optical device for each of a plurality of locations 302-315 on a calibration pattern as a function of a focus position of the optical device. The horizontal axis 322 represents the focus position, measured in millimeters, and the vertical axis 324 represents the modulation transfer function. A depth of focus for the optical device is indicated as a solid, double headed arrow 326. In the illustrated chart 300, the tip and the tilt are selected to optimize a depth of focus for the optical device across the plurality of locations 302-315. In particular, the tip and tilt are selected to provide the widest range of focus positions for which the MTF for each location is above a threshold value specific to that location. It will be appreciated, for example, that locations that are close to a center of a calibration image may have a higher threshold value than locations on a periphery of the image.

Figure 4:
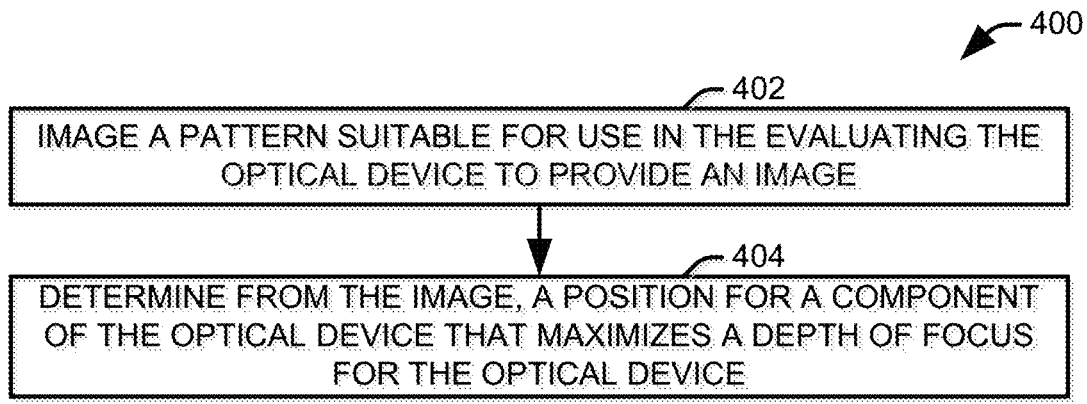
FIG. 4 illustrates a method for evaluating the optical device.

In view of the foregoing structural and functional features described above in FIGS. 1-3, an example method will be better appreciated with reference to FIG. 4. While, for purposes of simplicity of explanation, the method of FIG. 4 is shown and described as executing serially, it is to be understood and appreciated that the present invention is not limited by the illustrated order, as some actions could in other examples occur in different orders and/or concurrently from that shown and described herein.

FIG. 4 illustrates a method 400 for evaluating an optical device. At 402, a pattern suitable for use in the evaluating the optical device is imaged to provide an image. In one implementation, the pattern contains a plurality of targets at known locations within a field of view of the optical device. At 404, a position for a component of the optical device that maximizes a depth of focus for the optical device is determined from the image. In one implementation, the position is determined position as a tip and a tilt of the optical component relative to an image sensor plane associated with the optical device. The determined position can then be displayed to a user via a user interface or otherwise used to affix the component within the optical device at the determined position.

In one example, a set of metrics, comprising an optical quality metric for each of a plurality of focus positions, is determined for each of a plurality of locations on the image and each of a plurality of positions for the optical component. In one implementation, the optical quality metric is a modulation transfer function. In another implementation, the optical quality metric is a surrogate value for the modulation transfer function that correlates with the modulation transfer function. Accordingly, the data for each location can be represented as a multi-dimensional table with one or more dimensions representing the position of the optical component (e.g., as tip and tilt) and another dimension representing the focus position. The position that maximizes a range for which the modulation transfer function for each of the plurality of locations exceeds a threshold value associated with the location can be selected to maximize the depth of focus. It will be appreciated that the threshold value can vary across positions, such that a first position of the plurality of positions is different than a second threshold value associated with a second position of the plurality of positions.

Figure 5:
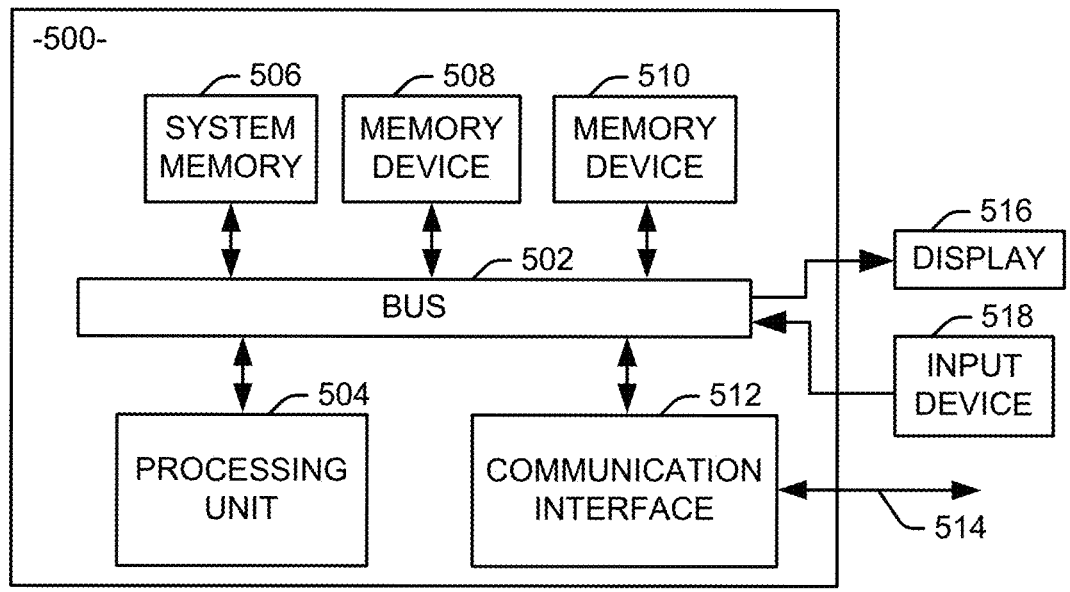
FIG. 5 is a schematic block diagram illustrating an exemplary system of hardware components capable of implementing examples of the systems and methods disclosed in FIGS. 1-4.

FIG. 5 is a schematic block diagram illustrating an exemplary system 500 of hardware components capable of implementing examples of the systems and methods disclosed in FIGS. 1-4, such as the image analysis system 20 illustrated in FIG. 1. The system 500 can include various systems and subsystems. The system 500 can be a personal computer, a laptop computer, a workstation, a computer system, an appliance, an application-specific integrated circuit (ASIC), a server, a server blade center, a server farm, etc.

The system 500 can include a system bus 502, a processing unit 504, a system memory 506, memory devices 508 and 510, a communication interface 512 (e.g., a network interface), a communication link 514, a display 516 (e.g., a video screen), and an input device 518 (e.g., a keyboard and/or a mouse). The system bus 502 can be in communication with the processing unit 504 and the system memory 506. The additional memory devices 508 and 510, such as a hard disk drive, server, stand-alone database, or other non-volatile memory, can also be in communication with the system bus 502. The system bus 502 interconnects the processing unit 504, the memory devices 506-510, the communication interface 512, the display 516, and the input device 518. In some examples, the system bus 502 also interconnects an additional port (not shown), such as a universal serial bus (USB) port.

The processing unit 504 can be a computing device and can include an application-specific integrated circuit (ASIC). The processing unit 504 executes a set of instructions to implement the operations of examples disclosed herein. The processing unit can include a processing core.

The additional memory devices 506, 508, and 510 can store data, programs, instructions, database queries in text or compiled form, and any other information that can be needed to operate a computer. The memories 506, 508 and 510 can be implemented as computer-readable media (integrated or removable) such as a memory card, disk drive, compact disk (CD), or server accessible over a network. In certain examples, the memories 506, 508 and 510 can comprise text, images, video, and/or audio, portions of which can be available in formats comprehensible to human beings. Additionally or alternatively, the system 500 can access an external data source or query source through the communication interface 512, which can communicate with the system bus 502 and the communication link 514.

In operation, the system 500 can be used to implement one or more parts of an evaluation system in accordance with the present invention. Computer executable logic for implementing the evaluation system resides on one or more of the system memory 506, and the memory devices 508 and 510 in accordance with certain examples. The processing unit 504 executes one or more computer executable instructions originating from the system memory 506 and the memory devices 508 and 510. The term "computer readable medium" as used herein refers to any medium that participates in providing instructions to the processing unit 504 for execution, and it will be appreciated that a computer readable medium can include multiple computer readable media each operatively connected to the processing unit.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

What have been described above are examples of the present invention. It is, of course, not possible to describe every conceivable combination of components or methodologies for purposes of describing the present invention, but one of ordinary skill in the art will recognize that many further combinations and permutations of the present invention are possible. While certain novel features of this invention shown and described below are pointed out in the annexed claims, the invention is not intended to be limited to the details specified, since a person of ordinary skill in the relevant art will understand that various omissions, modifications, substitutions and changes in the forms and details of the invention illustrated and in its operation may be made without departing in any way from the spirit of the present invention. Accordingly, the present invention is intended to embrace all such alterations, modifications, and variations that fall within the scope of the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements. No feature of the invention is critical or essential unless it is expressly stated as being "critical" or "essential."

What is claimed is:

1. A system for evaluating an optical device, the system comprising:
   a pattern source that provides a pattern suitable for use in the evaluating the optical device;
   the optical device, which includes an image sensor with an associated image sensor plane that images the pattern to provide an image; and
   an image analysis system that determines, from the image, a tip and a tilt for a component of the optical device relative to the image sensor plane that maximizes a depth of focus for the optical device, wherein the depth of focus for the optical device is a range of distances between the component and the image sensor plane along a first axis orthogonal to the image plane for which an optical quality value associated with the optical device meets a threshold level, the tip for the component is a departure of the component from a plane parallel to the image sensor plane along a second axis that is orthogonal to the first axis, and the tilt for the component is a departure of the component from a plane parallel to the image sensor plane along a third axis that is orthogonal to each of the first axis and the second axis.

2. The system of claim 1, wherein the image analysis system comprises a processor and a non-transitory computer readable medium storing executable instructions executable by the processor.

3. The system of claim 1, further comprising a user interface that displays the determined tip and the determined tilt for the component of the optical device to a user.

4. The system of claim 1, wherein the image analysis system determines, for each of a plurality of locations on the image, a set of metrics comprising the optical quality value for each of a plurality of focus positions and each of a plurality of positions for the component, a given position of the plurality of positions representing an ordered pair of tip and tilt values.

5. The system of claim 4, wherein the optical quality value is a modulation transfer function value.

6. The system of claim 4, wherein the image analysis system selects the position of the plurality of positions for the component of the optical device that maximizes a range for which the optical quality value for each of the plurality of locations exceeds a threshold value associated with the location.

7. The system of claim 6, wherein a first threshold value associated with a first location of the plurality of locations is different than a second threshold value associated with a second location of the plurality of locations.

8. The system of claim 4, wherein the optical quality value is a surrogate value for a modulation transfer function value that correlates with the modulation transfer function.

9. A method for evaluating an optical device including an image sensor with an associated image sensor plane, the method comprising:
   imaging a pattern suitable for use in the evaluating the optical device to provide an image; and
   determining, from the image, a tip and a tilt for a component of the optical device relative to the image sensor plane that maximizes a depth of focus for the optical device, wherein the depth of focus for the optical device is a range of distances between the component and the image sensor plane along a first axis orthogonal to the image plane for which an optical quality value associated with the optical device meets a threshold level, the tip for the component is a departure of the component from a plane parallel to the image sensor plane along a second axis that is orthogonal to the first axis, and the tilt for the component is a departure of the component from a plane parallel to the image sensor plane along a third axis that is orthogonal to each of the first axis and the second axis.

10. The method of claim 9, further comprising displaying the determined tip and tilt for the component of the optical device to a user via a user interface.

11. The method of claim 9, wherein determining the position of the component comprises determining, for each of a plurality of locations on the image, a set of metrics comprising the optical quality metric for each of a plurality of focus positions and each of a plurality of positions for the component, a given position of the plurality of positions representing an ordered pair of tip and tilt values.

12. The method of claim 11, wherein the optical quality value is a modulation transfer function value.

13. The method of claim 11, wherein determining the position of the component comprises selecting the position of the plurality of positions for the component of the optical device that maximizes a range for which the optical quality metric for each of the plurality of locations exceeds a threshold value associated with the location.

14. The method of claim 13, wherein a first threshold value associated with a first location of the plurality of locations is different than a second threshold value associated with a second location of the plurality of locations.

15. The method of claim 11, wherein the optical quality value is a surrogate value for a modulation transfer function value that correlates with the modulation transfer function.

16. The method of claim 9, further comprising affixing the component within the optical device with the determined tip and tilt.

* * * * *